United States Patent [19]
Feist

[11] Patent Number: 6,044,567
[45] Date of Patent: Apr. 4, 2000

[54] GEODETIC DEVICE

[75] Inventor: Wieland Feist, Jena, Germany

[73] Assignee: Carl Zeiss Jena GmbH

[21] Appl. No.: 09/061,888

[22] Filed: Apr. 17, 1998

[30] Foreign Application Priority Data

Apr. 18, 1997 [DE] Germany .......................... 197 16 304

[51] Int. Cl.⁷ .......................... G01B 11/26; G01C 15/08
[52] U.S. Cl. .............................................. 33/292; 33/290
[58] Field of Search ............................. 33/292, 290, 293, 33/295, 281, 282, 283, 285, 286

[56] References Cited

U.S. PATENT DOCUMENTS

| | | | |
|---|---|---|---|
| 3,471,234 | 10/1969 | Studebaker | 33/285 |
| 4,752,126 | 6/1988 | Fujii | 33/285 |
| 4,988,192 | 1/1991 | Kittel | 33/281 |
| 5,159,760 | 11/1992 | Spiegel et al. | 33/292 |
| 5,212,889 | 5/1993 | Lysen | 33/286 |
| 5,711,080 | 1/1998 | Yamada | 33/292 |
| 5,839,199 | 11/1998 | Ogawa | 33/283 |
| 5,949,548 | 9/1999 | Shirai et al. | 33/292 |

*Primary Examiner*—Christopher W. Fulton
*Attorney, Agent, or Firm*—McAulay Nissen Goldberg Kiel & Hand, LLP

[57] ABSTRACT

A geodetic device is described, especially on a theodolite or a tachymeter which is provided with an arrangement for adjustment over a ground point or base point. It comprises a leveling base in which a bushing provided with a continuous center bore hole can be fastened and an upper part or alidade with a telescope which is pivotable about a horizontal tilting axis. Further, a first apparatus is provided for leveling the device in a horizontal plane and for displaying this plane, and a second apparatus is provided which comprise an objective imaging the ground point on a sensor arrangement. The arrangement for adjustment over a ground point is arranged between the leveling base and the upper part and is fixedly connected with the leveling base. It comprises a vertical spindle bushing with a hollow vertical spindle which is mounted therein and carries the upper part. This vertical spindle bushing is adjustable together with the vertical spindle in the coordinates of the horizontal plane relative to the leveling base.

12 Claims, 2 Drawing Sheets

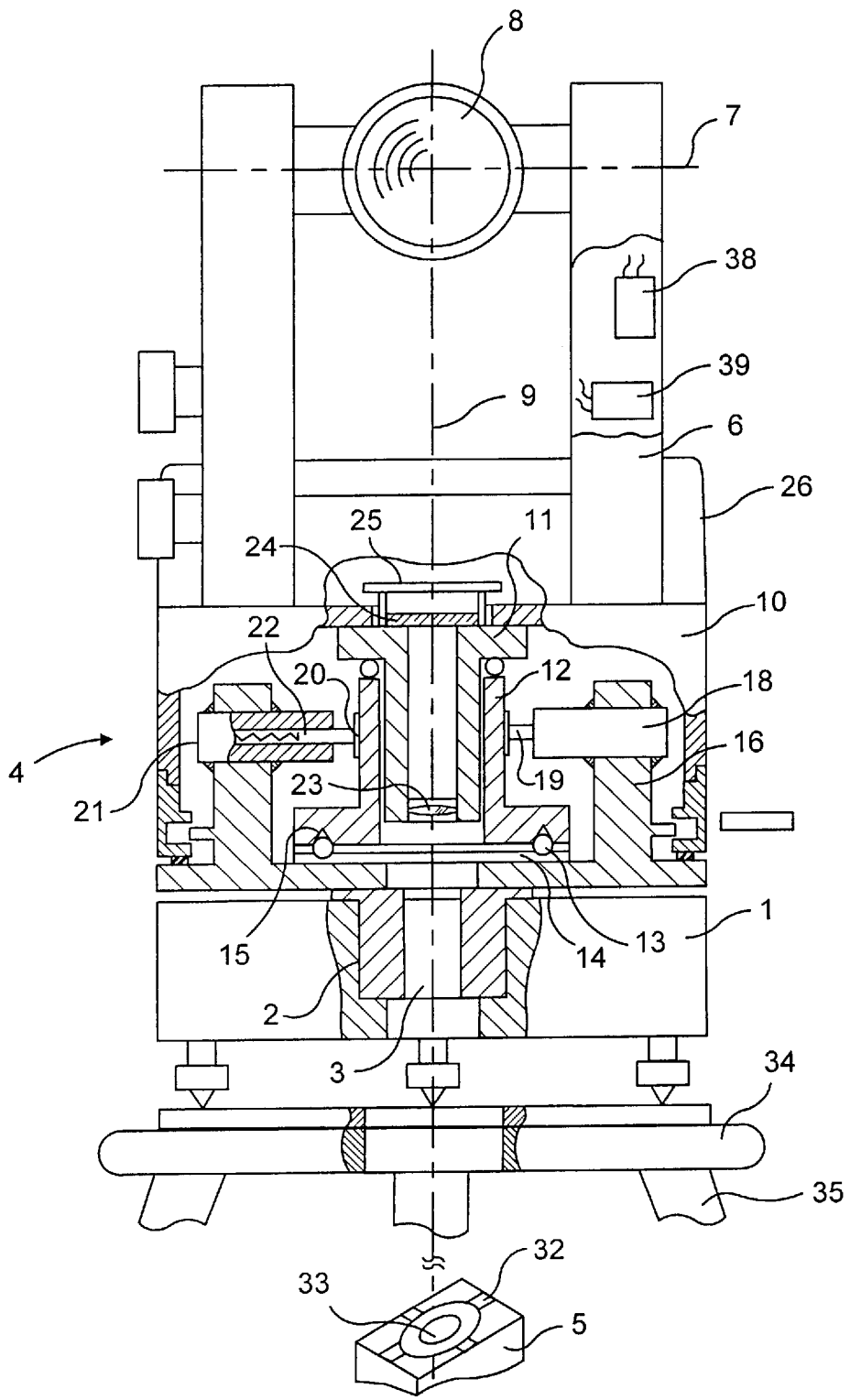
F I G. 1

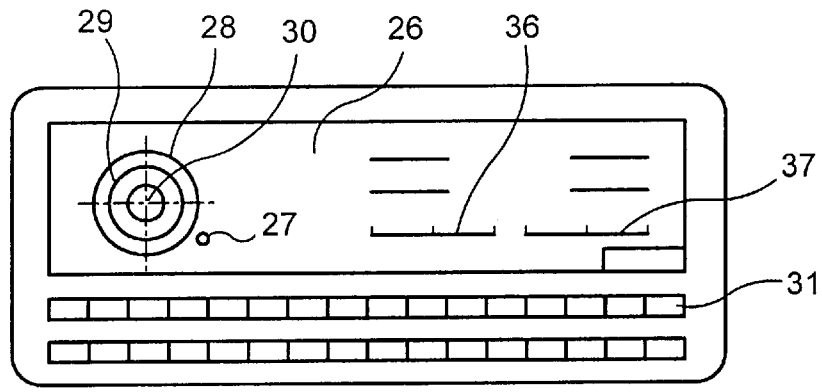
F I G. 2
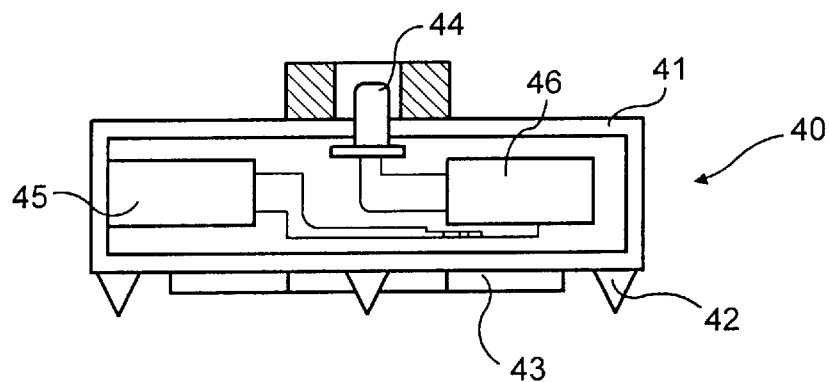
F I G. 3
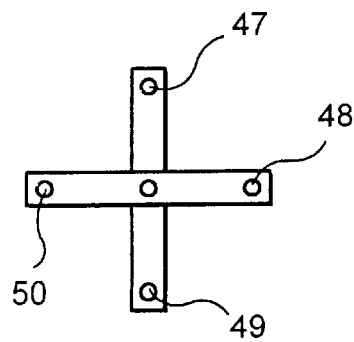
F I G. 4

GEODETIC DEVICE

BACKGROUND OF THE INVENTION a) Field of the Invention

The invention is directed to a geodetic device according to the preamble of the first patent claim. This device is outfitted with a plummet or plumb bob oriented to the base point or ground point. It can be used for theodolites or for electronic tachymeters or simply as a plumb bob or as means for adjusting according to zenith and/or nadir points.

b) Description of the Prior Art

The simplest solution for centering the vertical spindle of a geodetic device over the center of a geodetic fixed point or ground point is the plumb bob which is attached to the device and oriented to the center of the ground point. The plumb line accuracy is poor and is only adequate for simple centering.

For purposes of centering a geodetic device, the markings have centers of a mechanical type such as points, bore holes, concentric circles, crosses chiseled in stone, or nails, etc. In order to increase centering accuracy over a ground point of this kind, optical plummets for theodolites and tachymeters are known.

A known optical plummet has a small folded or bent telescope which can be focussed and whose objective lens lies in the vertical spindle of the geodetic device, wherein its tube with the eyepiece is arranged vertical thereto in the support. The ground point is illuminated by an optical light beam and the deviation from the center can be determined through the cross-hair of the eyepiece and corrected corresponding to the position of the geodetic device over the ground point. However, an exact centering is highly dependent on the existing illumination conditions and on the quality and nature of the ground point.

In an arrangement described in DE 4 007 245 A1 and DE-GM 296 03 681.1 for geodetic devices, an illuminating visible laser diode pen serves to mark, by its illuminating spot, the perpendicular-falling light beam on the ground point. In this case, the observer need no longer look into the eyepiece, but can observe and assess the centering process by the displacement of the device on the tripod directly at the location with the naked eye. A disadvantage consists in that the laser spot is difficult to see on dark marks. Also, assessing the centering process from such a relatively great distance brings about a loss in accuracy. Further, the laser spot is difficult to see when the surroundings are very bright.

The Japanese Applications 5-71961 (A) and 6-129854 (A) disclose arrangements for leveling geodetic devices by which the adjustment in the horizontal plane is carried out by motor-actuated adjustment of the foot screws of the device. The motor driving means are controlled by signals of electronic levels.

OBJECT AND SUMMARY OF THE INVENTION

The primary object of the invention is to provide a geodetic device with a plumb bob arrangement which can be adjusted automatically vertically over the ground point after leveling has been accomplished.

According to the invention, this object is met in a geodetic device with an arrangement for adjustment over a ground point or base point comprises a leveling base in which is arranged a bushing provided with a continuous bore hole and by which the device can be fastened to a tripod. Also included is an upper part or alidade with a telescope that is pivotable about a horizontal tilting axis. First means are provided for leveling the device in a horizontal plane and for displaying the horizontal position. Second means are provided which include an objective which images the ground point on a photoelectric sensor arrangement. The arrangement for adjustment over a ground point is arranged between the leveling base and the upper part and is fixedly connected with the leveling base. The arrangement further comprises a vertical spindle bushing with a hollow vertical spindle which is mounted therein and carries the upper part. The vertical spindle bushing is adjustable together with the vertical spindle in the coordinates of the horizontal plane relative to the leveling base.

Above all, the invention consists in that the vertical spindle bushing is arranged in the housing of the arrangement for adjustment over the ground point and, together with the vertical spindle which is mounted therein and which is connected with the upper part and carries the latter, is movable and accordingly adjustable in the two coordinates of the horizontal plane relative to the leveling base relative to the housing part which is fixedly connected with the leveling base, so that an adjustment of the upper part can be carried out in a fine adjustment process with the telescope vertically over a ground point.

For this purpose, the ground point is advantageously illuminated, e.g., by means of an external illumination device, or generates light itself by means of its own suitable light source.

In this case, the vertical spindle bushing provided in the housing of the arrangement between the leveling base and the upper part of the geodetic device is advantageously arranged on a cross-slide guide or cross-spring guide acting in two coordinates and is adjustable in the direction of these coordinates by manual or motor-operated drives. It is therefore possible to carry out an extensively automatic adjustment and alignment of the geodetic device over the ground point by means of a corresponding controlling of the drive. At least one drive is provided for this adjustment along each coordinate, wherein the drive is in a working connection, directly or via intermediate gear unit elements, with the vertical spindle. These coordinates are advantageously Cartesian coordinates which are perpendicular to one another.

In order to prevent backlash or, when movement is reversed, a reversing error during the adjustment, it is advantageous if the acting location of a counterforce which acts opposite to the driving force of the drive and which is smaller than the driving force lies diametrically opposite to the acting location of the respective drive at the vertical spindle bushing. This ensures that the movement is transmitted from the drive to the vertical spindle bushing without play and prevents a reversing error when the movement is reversed. This can be achieved when every drive cooperates with a counter-pull spring buffer which acts on the vertical spindle bushing and whose force is directed opposite to that of the drive.

In order to achieve a high degree of automation and an adjustment which is as free as possible from subjective influences, the motor-operated drives are advantageously controllable depending on the position of the vertical spindle relative to the ground point by means of a control device in such a way that the vertical spindle is positioned vertically over the ground point, wherein the control signals for the control device are supplied through the photoelectric sensor arrangement on which the ground point is imaged. A position-sensitive photoreceiver or a CCD matrix comprising CCD elements can be provided as a photoelectric sensor arrangement. The position-dependent photoreceiver is advantageously constructed as a quadrant receiver, wherein each quadrant comprises a photoreceiver. It is further advantageous if the sensor arrangement is arranged in the vertical spindle of the geodetic device.

The disadvantages of the prior art are eliminated by this geodetic device constructed in accordance with the invention. Thus, an improved marking of the center is achieved through the self-illumination of the ground point in that this center can be determined by image evaluating methods from the image of the ground point that is imaged on the CCD matrix, the signals supplied by the CCD elements being used for this purpose. Further advantages include the elimination of focussing on the ground point and accordingly also the elimination of subjective errors on the part of the observer, e.g., parallax errors, adjustment errors and/or recognition errors. Thus, the centering accuracy of the geodetic device over the ground point in question is increased. Further simplifications result from elimination of mechanical adjustment devices and of manual adjustment itself. An automatic device centering is achieved.

The invention will be explained more fully hereinafter with reference to an embodiment example.

BRIEF DESCRIPTION OF THE DRAWINGS

In the drawings:

FIG. 1 illustrates a simplified view of a geodetic device set up over a ground point;

FIG. 2 illustrates the display panel of a display unit connected with the device;

FIG. 3 shows a device for illuminating a ground point; and

FIG. 4 is a view of a device for illuminating a ground point cross.

DESCRIPTION OF THE PREFERRED EMBODIMENTS

The geodetic device shown in a simplified view in FIG. 1 comprises a leveling base 1 which is fixedly connected, via a bushing 2 provided with a center bore hole 3, with an arrangement 4 for adjusting the device over a nadir point or ground point 5, and an upper part 6 (alidade) in which a telescope 8 is mounted so as to be tiltable about a horizontal tilting axis 7. This upper part 6, together with a housing part 10 of the arrangement 4 serving as a closure, is fixedly connected with the vertical spindle 11 which is mounted so as to be free from play in a vertical-spindle bushing 12 provided in the arrangement 4 and enables a rotation of the upper part 6 together with the housing part 10 about the vertical axis 9. The vertical spindle bushing 12 is arranged on a cross-slide guide 13; 14; 15, known per se, which lies on a base element 16 fastened to the bushing 2 of the leveling base 1. A cross-spring guide can also be provided instead of the cross-slide guide. A vertical spindle 11 arranged and mounted in this way provides for the possibility of adjusting it together with the upper part 6 of the device in the horizontal plane and accordingly realizing a fine adjustment over the ground point 5.

In order to realize this fine adjustment or precision displacement of the vertical spindle bushing 12 and accordingly of the vertical spindle 11 and of the entire upper part 6 of the geodetic device, at least one drive 18 which can be actuated manually or by means of a motor is provided in the interior of the arrangement 4 for a displacement along every coordinate and is fixedly secured in the base element 16. Each of the employed drives 18 is in a working connection with the vertical spindle bushing 12 by means of its movable pin 19. In order to prevent possible backlash or, when there is a reversal of movement, to prevent a reversing error during the displacement of the vertical spindle bushing 12 and to ensure the absence of play, an acting location 20 of a counterforce acting opposite to the driving force of the respective drive 18 is provided diametrically opposite to the acting location of every drive 18 at the vertical spindle bushing 12. This counterforce is smaller than the force of the respective drive 18 acting on the vertical spindle bushing 12. In order to generate this counterforce, a buffer arrangement 21 which is fixedly connected with the base element 16 is provided diametrically opposite to every drive 18, wherein the spring-mounted tappet or pin 22 of the buffer arrangement 21 acts on the vertical spindle bushing 16.

An objective 23 for imaging the ground point 5 on a photoelectric sensor arrangement 23 is inserted in the hollow vertical spindle 11 on the side facing the ground point 5, wherein the sensor arrangement 24 is situated at the end of the vertical spindle 11 remote of the ground point 5 and is connected with the printed circuit board 23 on which the processing electronics and computer for signal processing are arranged. The sensor arrangement 24 is advantageously 15 constructed as a CCD matrix of CCD elements.

The digital signals sent by the computer are shown as a floating mark 27 on a display 26 as is shown in a front view in FIG. 2. Further, stationary comparison marks 28; 29 with image center 30 are located on the display 26, wherein the comparison marks 28; 29 can be concentric circles, for example. The comparison marks 28; 29 are called up, for example, by actuation of a soft key 31 which is provided on a keyboard of the display 26. The geodetic device is then centered over the ground point 5 relative to its fixed-point or control point cross 32 and its centrally arranged ground mark 33 when the floating mark 27 on the display 26 is located in the center 30 of the comparison marks 28; 29. A coarse centering of the device over the ground point 5 or over the ground mark 33 is achieved by displacement of the same on the tripod dish 34 of a tripod 35. A precision centering is carried out by displacement of the vertical spindle bushing 12 and accordingly also of the upper part 6 in the cross-slide guide 12; 13; 14 by means of the drive 14.

Also found on the display 26 are indicators 36 and 37 for levels 38 and 39 which are located in the upper part 6 of the device and which can be constructed, for example, as electrolyte levels, whose signals are fed to the processing electronics or to the computer for further processing.

FIG. 3 shows a ground mark 40 which can be arranged centrically on the ground point 5. It comprises a housing 41 with feet 42 and preferably magnetic adhesion means 43 in which are centrically located a light source 44, e.g., a light emitting diode, a power source 45, and, where applicable, a printed circuit board 46 comprising the electrical circuit. As follows from FIG. 4, a ground mark 40 of this kind can also have a plurality of light sources 47; 48; 49; 50 arranged in cross shape. The light sources can be switched off by switches, not shown, when not in use.

The centering process for adjusting the geodetic device over the ground point 5 will now be explained more fully: The leveling base 1, together with the housing part 10 and the upper part 6, is placed on the tripod dish 34 of the tripod 35 which is set up over the ground point 5, and is then leveled by means of levels 38 and 39 and their indicators 36 and 37 on the display 26, and is coarsely oriented to the ground mark of the ground point 5 by means of manual displacement on the tripod dish 34, wherein the position of the floating mark 27 relative to the image center 30 is observed on the display 26, and the floating mark 27 is brought as close as possible to the image center 30. The fine adjustment of the device on the ground mark 33 of the ground point 5 is then carried out in that an adjustment of the vertical spindle bushing 12 on the cross-slide guide 13; 14; 15 is carried out by means of the drive 18 in two orthogonal directions of the horizontal plane, wherein the control of the drives is effected by means of signals which have been generated and supplied by the processing electronics and the existing computer (not shown). The device is positioned centrically over the ground point 5 when the floating mark 27 lies in the image center 30 on the display 26.

While the foregoing description and drawings represent the preferred embodiments of the present invention, it will be obvious to those skilled in the art that various changes and modifications may be made therein without departing from the true spirit and scope of the present invention.

What is claimed is:

1. A geodetic device with an arrangement for adjustment over a ground point or base point, comprising:
   - a leveling base in which is arranged a bushing provided with a continuous bore hole and by which the device can be fastened to a tripod;
   - an upper part or alidade with a telescope that is pivotable about a horizontal tilting axis;
   - first means for leveling the device in a horizontal plane and for displaying the horizontal position; and
   - second means including an objective which images the ground point on a photoelectric sensor arrangement;
   - said arrangement for adjustment over a ground point being arranged between the leveling base and said upper part and being fixedly connected with the leveling base;
   - said arrangement further comprising a vertical spindle bushing with a hollow vertical spindle which is mounted therein and carries the upper part;
   - wherein the vertical spindle bushing is adjustable together with the vertical spindle in the coordinates of the horizontal plane relative to the leveling base.

2. The geodetic device according to claim 1, wherein the ground point is illuminated or generates illumination itself.

3. The geodetic device according to claim 1, wherein the objective is arranged in the vertical spindle for imaging the ground point on a photoelectric sensor arrangement.

4. The geodetic device according to claim 1, wherein the vertical spindle is arranged on a cross-slide guide or cross-spring guide acting in two coordinates and is adjustable in the direction of these coordinates by manual or motor-operated drives.

5. The geodetic device according to claim 4, wherein at least one drive which is arranged in the housing of the arrangement in a stationary manner is provided for each coordinate, wherein this at least one drive is in a working connection with the vertical spindle bushing.

6. The geodetic device according to claim 4, wherein an acting location of a counterforce acting opposite to the driving force and generated by a buffer arrangement is diametrically opposite to the acting location of the respective drive at the vertical spindle bushing.

7. The geodetic device according to claim 4, wherein the motor-operated drives are controllable depending on the position of the vertical spindle relative to the ground point by a control device in such a way that the vertical spindle is positioned vertically over the ground point, wherein the control signals for the control device are supplied through the photoelectric sensor arrangement on which the ground point is imaged.

8. The geodetic device according to claim 7, wherein the photoelectric sensor arrangement is a position-sensitive photoreceiver or a CCD matrix comprising CCD elements.

9. The geodetic device according to claim 8, wherein the photoreceiver is a quadrant receiver.

10. The geodetic device according to claim 8, wherein the sensor arrangement is arranged in the vertical spindle of the device.

11. The geodetic device according to claim 1, wherein the two coordinates of the plane extend perpendicular to one another.

12. The geodetic device according to claim 1, wherein the center of the ground point is determined by image evaluation from the image signals supplied by the CCD matrix.

* * * * *